United States Patent [19]
Kim

[11] Patent Number: 5,883,753
[45] Date of Patent: Mar. 16, 1999

[54] PINCH ROLLER SWITCHING MECHANISM OF AN AUTO REVERSE CAR AUDIO DEVICE FOR SAFELY FIXING A SELECTED PINCH ROLLER

[75] Inventor: Yu-In Kim, Incheon, Rep. of Korea

[73] Assignee: Daewoo Electronics Co., Ltd., Seoul, Rep. of Korea

[21] Appl. No.: 867,444

[22] Filed: Jun. 2, 1997

[30] Foreign Application Priority Data

Aug. 29, 1996 [KR] Rep. of Korea .................. 1996-36240

[51] Int. Cl.⁶ ............................ G11B 5/008; G11B 19/02
[52] U.S. Cl. .......................................... 360/96.1; 360/105
[58] Field of Search .......................... 360/93, 96.1, 96.2, 360/96.3, 105

[56] References Cited

U.S. PATENT DOCUMENTS 4,527,210 7/1985 Takamatsu ................................ 360/93
5,450,275 9/1995 Kunze et al. ........................... 360/96.3

Primary Examiner—George J. Letscher
Attorney, Agent, or Firm—Beveridge, DeGrandi, Weilacher & Young LLP

[57] ABSTRACT

A mechanism for switching pinch rollers of an autoreverse car audio device has a mode changing lever actuated by a driving motor. The mode changing lever causes a rotation of a switching lever movably installed at a rear face of a deck frame. One end of the switching lever is engaged with one end of a pinch roller selecting plate for selecting one of pinch rollers according to an operation mode. The pinch roller selecting plate is actuated relative with the switching lever rotated according to the operation mode. Therefore, one of the pinch rollers approaches a corresponding turntable wheel.

13 Claims, 4 Drawing Sheets

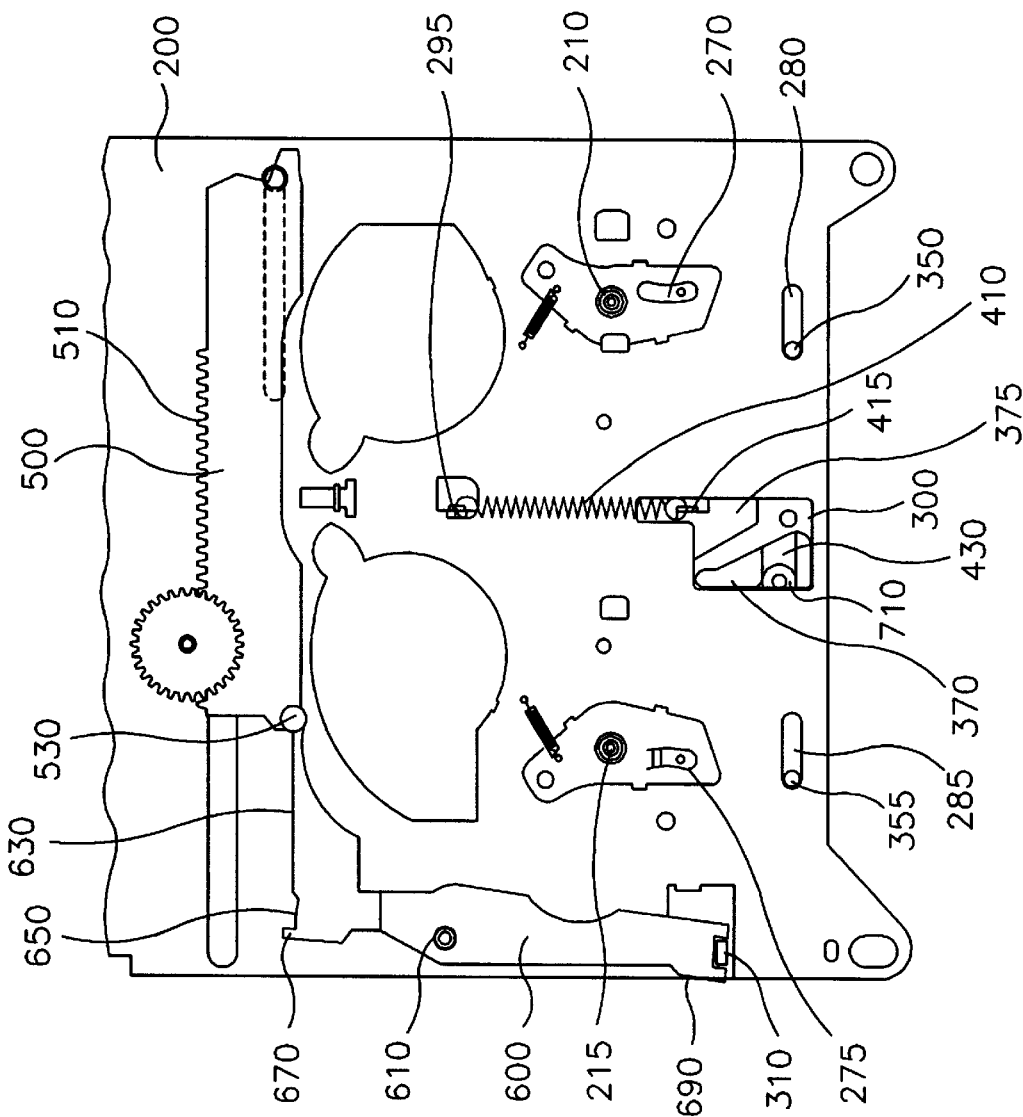

PINCH ROLLER SWITCHING MECHANISM OF AN AUTO REVERSE CAR AUDIO DEVICE FOR SAFELY FIXING A SELECTED PINCH ROLLER

BACKGROUND OF THE INVENTION

1. Field of the Invention

The present invention relates to a mechanism for switching pinch rollers of an autoreverse car audio device, more particularly to a mechanism for switching pinch rollers of an autoreverse car audio device for switching pinch rollers by a switching lever actuated relative with a mode changeover lever installed at an autoreverse car audio device and for safely fixing a selected pinch roller.

2. Description of the Prior Art

Audio devices recently developed are designed to accomplish various functions like an autoreverse, a section repetition, etc. In particular, the autoreverse function automatically reverses a tape traveling movement after the tape is finished forward traveling. The autoreverse type car audio device having the autoreverse function comprises a mechanism for switching the traveling direction to a reverse direction when the forward traveling of the tape is finished. Also, the device needs a pinch roller switching device in which one pinch roller is lifted from a corresponding capstan and the other pinch roller approaches the other capstan. Hence, various pinch roller switching devices are proposed.

One of the conventional pinch roller switching devices is disclosed in U.S. Pat. No. 4,932,605. In FIG. 1, the conventional pinch roller switching device comprises a pivotal drive mechanism 9 which is rotatable between two turntables to drive a first turntable in a first position and a second turntable in a second position. The pivotal drive mechanism 9, when it is pivoted between its first position and its second position in the case of reversing the direction of tape transport, actuates a change-over device for a pair of pressure rollers. The change-over device by means of slides 49, 50 lifts a first pressure roller 32 or a second pressure roller 33 journalled on levers 34, 35 off an associated capstans 30, 31 against a spring force. The pressure roller levers 34, 35 are pivoted about a pivotal axis 25 by the pivotal drive mechanism 9 and the slides 49, 50 via a first and a second cam lever 24 respectively. The cam levers 24 comprise cam surfaces which are followed by the pressure roller levers 34, 35. When the pivotal drive mechanism 9 approaches the first turntable wheel 12 or the second turntable wheel 13, one of the cam levers 24 is pivoted further via a pressure position of the cam surface by the spring force acting on the associated pressure-roller levers 34, 35, in such a way that one of the slides 49, 50 is urged into an end position by the pressure-roller levers 34, 35. In the end position the pivotal drive mechanism 9 is disengaged from the change-over device.

The conventional pinch roller switching mechanism of the autoreverse car audio device as described above is complicated because of the switching the pinch rollers by using levers, arms, and handspikes.

SUMMARY OF THE INVENTION

Accordingly it is an object of the present invention to provide a pinch roller switching device capable of switching the pinch roller by simple members.

It is another object of the present invention to provide a pinch roller switching device which reduces a troubling occurances by providing a switching device with the simple constructions.

To achieve the above objects, a pinch roller switching mechanism of an autoreverse car audio device for safely fixing a selected pinch roller according to the present invention comprises:

a deck frame installed at a deck chassis of a car audio device and having a base installed with pinch rollers thereon;

an operation mode changing portion movably installed at a rear face of the deck frame to move in a parallel direction about the deck frame by a driving motor according to the operation mode for changing operation modes of the car audio device;

a switching portion pivotally installed at the rear face of the deck frame and in contact with the operation mode changing portion for switching the pinch roller according to the movement of the operation mode changing portion;

a head transporting portion movably installed at the deck frame for transporting a head installed thereon in a tape direction and the opposite direction;

a pinch roller selecting portion movably installed between the deck frame and the head transporting portion and in contact with the other side of the operation mode changing portion for selecting one of the pinch rollers and moving the selected pinch roller toward a corresponding turntable wheel; and a movement limiting portion movably installed at the head transporting portion for limiting the movement of the pinch roller selecting portion. The switching portion is installed on the deck frame and pivoted about a pivotal axis. The pinch roller selecting portion actuates relative with the switching portion pivoted according to each operation mode. The pinch roller selecting portion selects one of the pinch rollers. The selected pinch roller approaches the corresponding turntable shaft. The pinch roller selecting portion has blocking blades for stopping movement of the other pinch roller shaft toward the corresponding turntable wheel.

In the pinch roller switching mechanism for safely fixing a selected pinch roller according to the present invention, the switching lever pivots according to the sliding of the operation mode changing portion, and the pinch roller selecting portion is actuated relative with the pivoted switching portion. One of the pinch rollers approaches the corresponding turntable shaft by one of the blocking blades of the pinch roller selecting portion. Hence, the pinch roller is easily selected by the simple members actuated relative with the operation mode changing portion. Also, the selected pinch roller is safely fixed by the pinch roller selecting portion.

BRIEF DESCRIPTION OF THE DRAWINGS

The present invention will be better understood and its various objects and advantages will be more fully appreciated from the following description taken in conjunction with the accompanying drawings, in which:

FIG. 4 shows a rear face of the deck frame of the pinch roller switching mechanism according to the present invention.

DETAILED DESCRIPTION OF THE PREFERRED EMBODIMENT

Hereinafter, the present invention will be described in detail with reference to the drawings.

Figure 1:
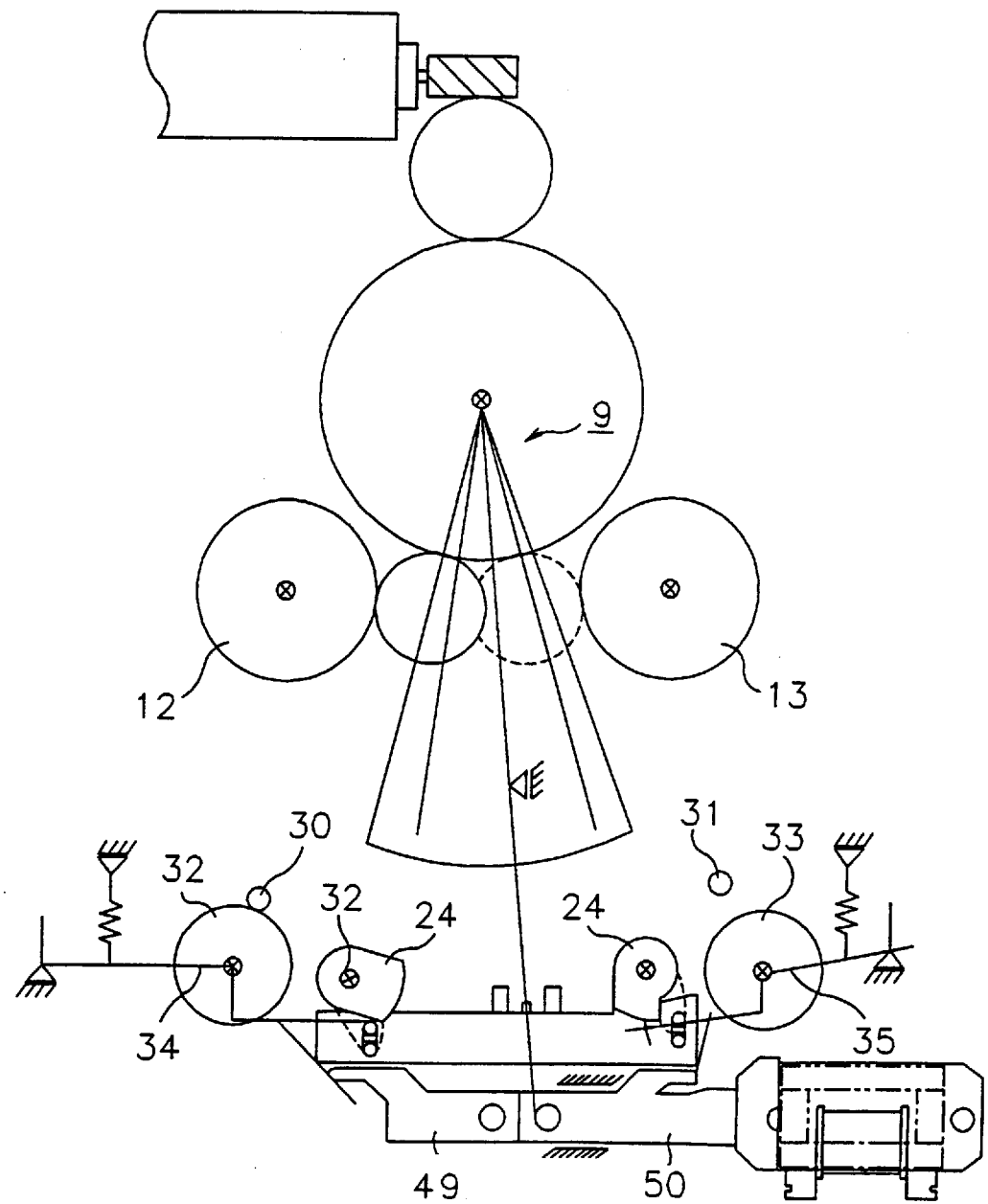
FIG. 1 shows a conventional pinch roller switching device mechanism.
Figure 2:
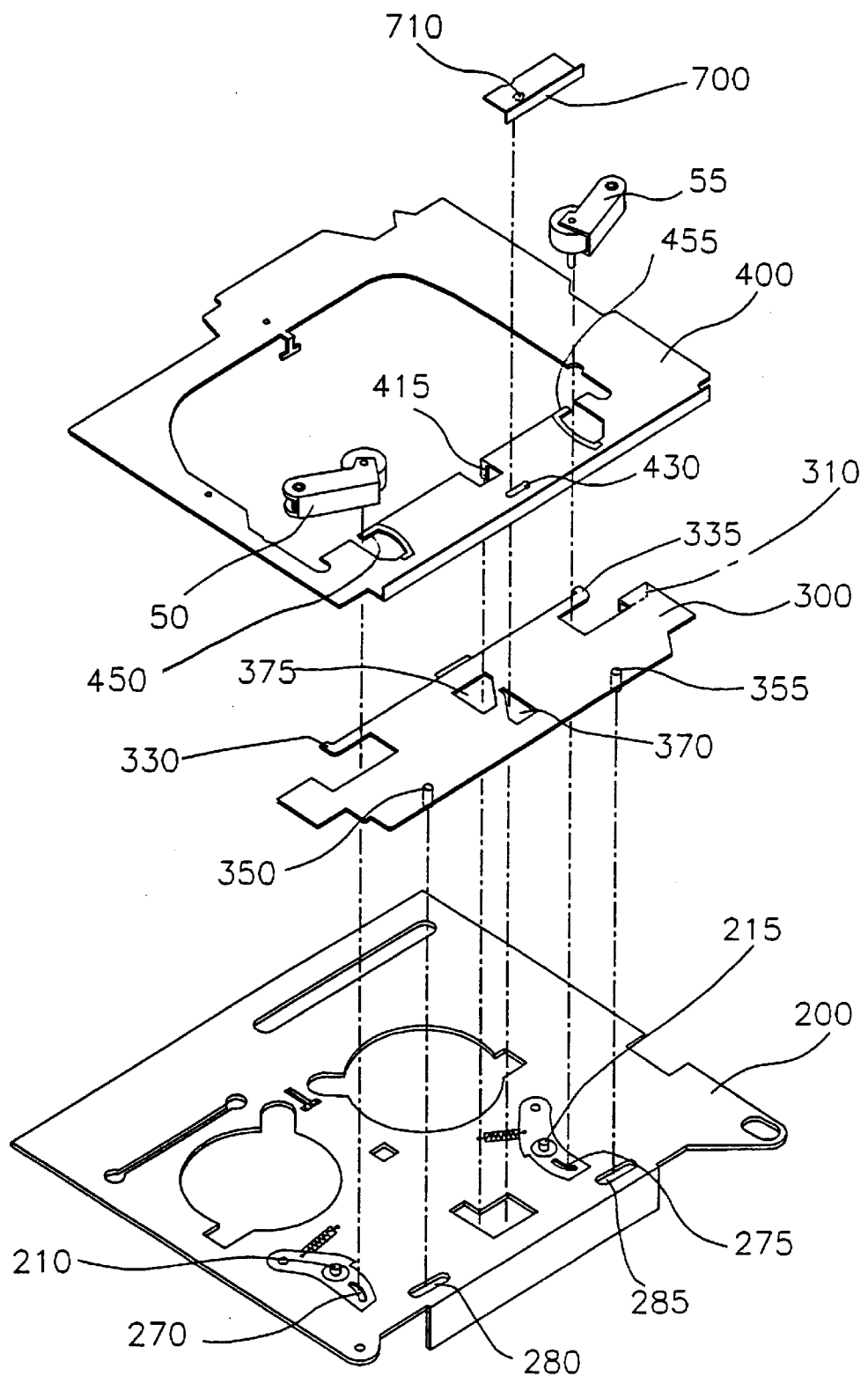
FIG. 2 is an exploded perspective view of a pinch roller switching mechanism according to the present invention.
Figure 3:
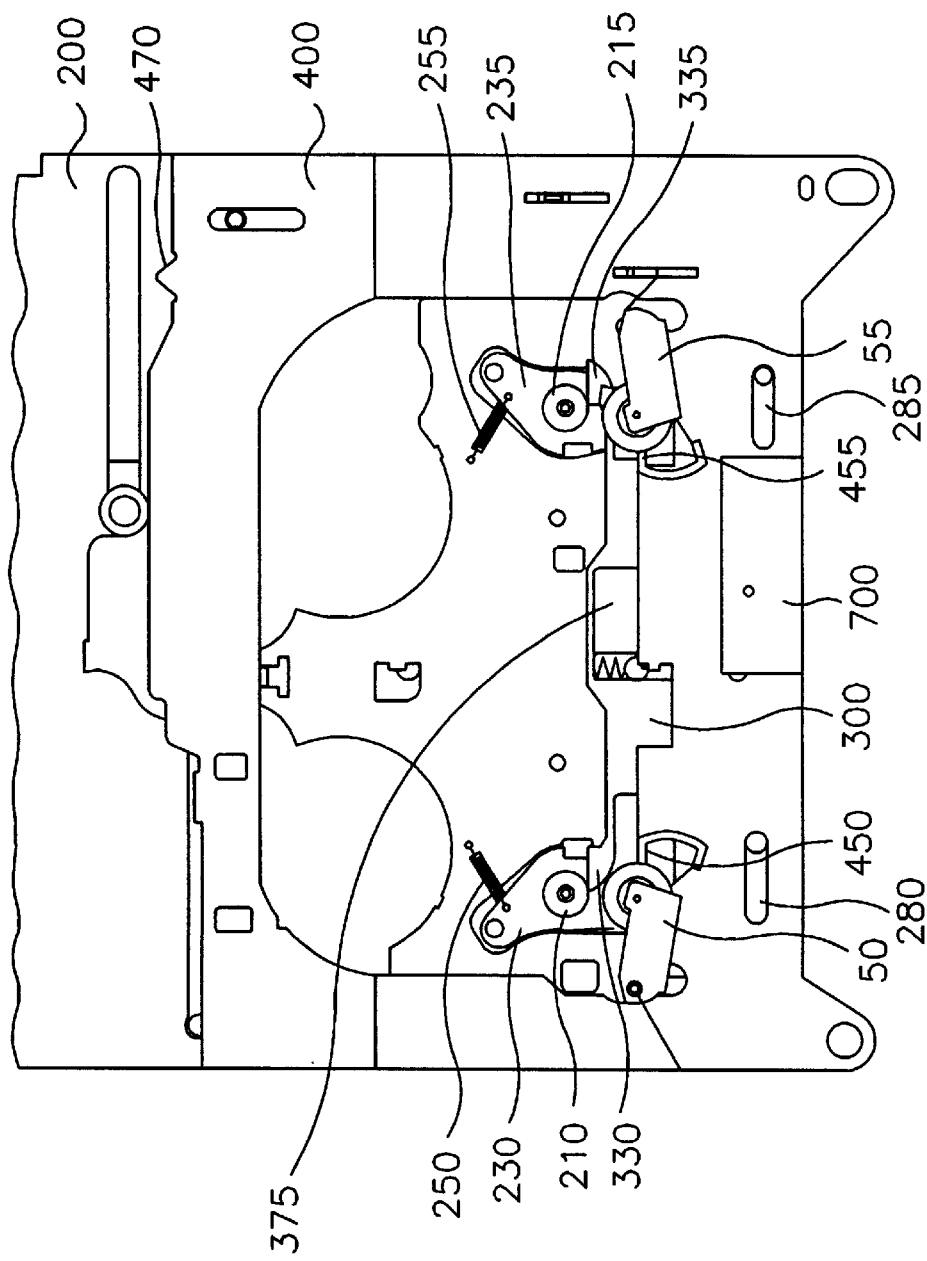
FIG. 3 is a plane view of the pinch roller switching mechanism according to the present invention.

FIG. 2 is an exploded perspective view of a pinch roller switching mechanism according to the present invention, FIG. 3 is a plane view of the pinch roller switching mechanism according to the present invention, and FIG. 4 shows a rear face of the deck frame of the pinch roller switching device according to the present invention.

In an autoreverse car audio device a forward reel shaft, a rewind reel shaft, a printed circuit board, a turntable, etc. are installed on a car audio deck. A deck frame 200 is installed on a chassis (not shown) of the car audio device and has a base on which a pair of pinch roller 50, 55 are installed. Turntable shaft inserting members 210, 215 are inserted to pinch roller shaft guiding members 230, 235 for guiding pinch rollers 50, 55 and installed on a predetermined position of an upper face of the base of deck frame 200. Pinch roller shaft guiding members 230, 235 define holes 270, 275 for moving shafts of pinch rollers 50, 55 therethrough according to a change of the operation mode. Deck frame 200 defines holes at positions corresponding with holes 270, 275 of pinch roller shaft guiding members 230, 235. Elastic springs 250, 255 for returning pinch roller shaft guiding members 230, 235 to their original positions according to the change of the operation mode are installed between pinch roller shaft guiding members 230, 235 and deck frame 200. A mode changing lever 500 is installed at a rear face of deck frame 200 and slides thereon. Mode changing lever 500 is actuated relative with a driving motor(not shown) for changing the operation mode of the car audio device. A rack 510 engaged with gears (not shown) for converting the rotary motion into a rectilinear motion is formed at one side of mode changing lever 500. A switching lever 600 for switching pinch rollers 50, 55 according to movement of mode changing lever 500 is rotatively installed at the rear face of deck frame 200 by a pivoting shaft 610. One side of switching lever 600 is contacted with one side of mode changing lever 500 capable of relative operation. Mode changing lever 500 and switching lever 600 are engaged by a contacting portion 530 installed at mode changing lever 500. Contacting portion 530 is a roller in the present invention.

A head transporting plate 400 is movably installed on the upper face of deck frame 200 for changing the position of a head (not shown) to contact the head with a tape (not shown) according to the operation mode. The head is installed on head transporting plate 400. Head transporting plate 400 transfers the head a tape direction and the opposite direction. Head transporting plate 400 has a cam 470 engaged with mode changing lever 500. Cam 470 converts a horizontal movement of mode changing lever 500 into a vertical movement of head transporting plate 400. A pinch roller selecting plate 300 for switching pinch rollers 50, 55 and for moving the selected pinch roller toward a corresponding turntable wheel is movably installed between deck frame 200 and head transporting plate 400. One side of pinch roller selecting plate 300 is engaged and installed with the other side of switching lever 600. Pinch roller selecting plate 300 is actuated relative with mode changing lever 500 through switching lever 600. A guiding plate 700 for limiting a range of movement of pinch roller selecting plate 300 is movably installed on head transporting plate 400. A roller 710 for connecting guiding plate 700 with head transporting plate 400 is installed at a rear face of guiding plate 700 toward head transporting plate 400. Roller 710 engages with a limiting portion 430 formed at a predetermined position of head transporting plate 400.

Switching lever 600 pivots according to the movement of contacting portion 530 installed at mode changing lever 500. Switching lever 600 comprises a sliding portion upon which contacting portion 530 slides according to the operation mode and a switching portion 690 which is formed at the opposite side of the sliding portion for engaging with pinch roller selecting plate 300. The sliding portion comprises a head releasing portion 630, which is formed in a straight line with a predetermined length, capable of moving the head between an ejecting position and an operating position. The sliding portion comprises a transitional portion 650 enlarged from one end of head releasing portion 630. Transferring portion 650 provides a route upon which contacting portion 530 slides for moving pinch roller selecting plate 300 from the playing position to the ejecting position and the opposite direction thereof. The sliding portion also comprises a pivoting portion 670 protruded from the end of transitional portion 650. Pivoting portion 670 urged by contacting portion 530 pivots switching lever 600. An end of switching portion 690 is bifurcated. The bifurcated end engages with one side of pinch roller selecting plate 300. Pinch roller selecting plate 300 is slid by switching portion according to the pivoting of switching lever 600. Hence, one of pinch rollers 50, 55 approaches one of turntable shaft inserting members 210, 215.

Head transporting plate 400 comprises pinch roller removing members 450, 455 for moving one of pinch rollers 50, 55 from the corresponding turntable wheel and for removing the unselected pinch roller from a corresponding turntable wheel during the operation mode during the operation mode, limiting portion 430 engaged with roller 710 installed at guiding plate 700 for limiting the range of movement of guiding plate 700, and a fastening protrusion 415 for fixing one side of an elastic spring 410. During the ejection mode, pinch roller moving members 450, 455 receive the shafts of pinch rollers 50, 55 to prevent pinch rollers 50, 55 from approaching turn table shaft inserting members 210, 215. Also, during the operation mode, pinch roller moving members 450, 455 lead the shafts of pinch rollers 50, 55 for permitting pinch rollers 50, 55 to selectively approach the corresponding turntable shaft inserting members 210, 215. Fastening protrusion 415 is formed at a position between both pinch roller moving members 450, 455 and protrudes toward the rear face of head transporting plate 400. One end of elastic spring 410 contacts with a fixing protrusion 295 formed at deck frame 200, and the other side of elastic spring 410 contacts with fastening protrusion 415. Limiting portion 430 is formed as a groove.

Pinch roller selecting plate 300 comprises a base portion and a selecting portion. The base portion has an engaging portion 310 which is engaged with the bifurcated end of switching lever 600 according to the pivoting of switching lever 600. Engaging portion 310 protrudes toward deck frame 200. In the center of the upper face of the base portion a roller guidance hole 370 is formed. On the rear side of the base portion protrusions 350, 355 are formed, which slide from the direction of pinch roller 50 to the direction of pinch roller 55 and in an opposite direction along with sliding grooves 280, 285 formed at deck frame 200. The selecting portion is enlarged from one side of the base portion toward a direction of pinch roller 50 and a direction of pinch roller 55. At the center of the upper face of the selecting portion a limiting hole 375 is formed which receives fastening protrusion 415 of head transporting plate 400. Fastening protrusion 415 moves along limiting hole 375. Blocking blades 330, 335 are formed at both sides of limiting hole 375 and enlarged from the selecting portion toward pinch rollers 50, 55. Blocking blades 330, 335 prevent the shaft unselected between the shafts of pinch rollers 50, 55 to move toward the corresponding turntable shaft inserting member. The front ends of both blocking blades 330, 335 are formed like a curve for guiding the shaft of the selected pinch roller toward the corresponding turntable shaft inserting member.

Hereinbelow, the operation of the pinch roller switching mechanism according to the present invention will be described.

When the operation mode is converted from the ejection mode to the playing mode, gears (not shown) rotate according to the rotation of the driving motor. The rotation of the gears is transferred to rack 510. Therefore mode changing lever 500 starts to slide in the direction of pinch roller 50 to pinch roller 55. Contacting portion 530 of mode changing lever 500 moves along with head releasing portion 630 of switching lever 600. Contacting portion 530 also slides along cam 470 of head transporting plate 400. Head transporting plate 400 moves toward the tape. Thus, the head contacts with a traveling face of the tape. Roller 710 fixed at guiding plate 700 moves along with roller guidance hole 370 of pinch roller selecting plate 300. Selected pinch roller 50 approaches turntable shaft inserting member 210 along with pinch roller moving member 450 installed at head transporting plate 400. At that time, blocking blade 335 prevents pinch roller 55 from approaching turn table shaft inserting member 215. As a result, the forward play mode is achieved.

When the operation mode is converted from the playing mode into the reverse mode, contacting portion 530 of mode changing lever 500 starts to move in the direction of pinch roller 50 to pinch roller 55 in continuation. Contacting portion 530 moves along with cam 470 of head transporting plate 400. Head transporting plate 400 departs from the traveling face of the tape. Contacting portion 530 pass by transitional portion 650 and then urges pivoting portion 670. Switching lever 600 pivots about pivot shaft 610. As shown in FIG. 4, switching lever 600 of the present embodiment rotates counterclockwise. Engaging portion 310 of pinch roller selecting plate 300 which is engaged with switching portion 690 moves in the opposite direction of the moving direction of mode changing lever 500 according to the pivoting of head switching lever 600. Roller 710 slides along with limiting portion 430 formed at head changing plate 400 according to the movement of engaging portion 310. As shown in FIG. 3, when pinch roller selecting plate 300 moves in the direction of pinch roller 55 toward pinch roller 50, blocking blade 330 pushes the shaft of pinch roller 50 into pinch roller moving member 450. Pinch roller 55 approaches turntable shaft inserting member 215.

As described above, the pinch roller switching mechanism according to the present invention has a simple construction, and therefore the number of assembling steps is reduced. Hence, the assembling time is also reduced. In the pinch roller switching mechanism according to the present invention, the switching lever pivots according to the sliding of the mode changing lever. The pinch roller selecting plate is actuated relative with the pivoted switching lever. Thus, one of the shafts of the pinch rollers approaches the corresponding turntable shaft by one of the blocking blades of the pinch roller selecting plate. As a result, the pinch rollers are easily switched by the simple members actuated relative with the mode changing lever. Also, the selected pinch roller is safely fixed at the predetermined position by the pinch roller selecting plate.

Although the present invention has been described and illustrated in detail, it is clearly understood that the same is by way of illustration and example only and is not to be taken by way of limitation wherein the spirit and scope of the present invention is limited only by the terms of the appended claims.

What is claimed is:

1. A pinch roller switching mechanism of an autoreverse car audio device for safely fixing a selected pinch roller comprising:

a deck frame installed at a deck chassis of a car audio device and having a base installed with pinch rollers thereon;

a means for changing an operation mode of the car audio device, said operation mode changing means movably installed at a rear face of said deck frame and moving parallel to the rear face of said deck frame according to the operation mode;

a means for switching said pinch rollers according to the movement of said operation mode changing means, said switching means pivotally installed at the rear face of said deck frame and contacted with said operation mode changing means;

a means for transporting a head toward a tape direction and the opposite direction, said head transporting means movably installed at said deck frame;

a means for selecting one of said pinch rollers and for moving a selected pinch roller toward a corresponding turntable wheel, said pinch roller selecting means movably installed at a position between said deck frame and said head transporting means, and having a base portion contacted with said switching means to actuate relative with said operation mode changing means and a selecting portion integrally enlarged from one side of the base portion for selecting one of the pinch rollers and for guiding the selected pinch roller toward the corresponding turntable wheel; and a means for limiting the movement of said pinch roller selecting means, said movement limiting means movably installed at said head transporting means; and wherein said head transporting means has pinch roller moving members being in the form of a bar, for safely fixing the selected pinch roller during the operation mode, and for removing the unselected cinch roller from a corresponding turntable wheel during the operation mode.

2. The pinch roller switching mechanism of an autoreverse car audio device for safely fixing a selected pinch roller as claimed in claim 1, wherein said operation mode changing means comprises a contacting portion installed at one side of said operation mode changing means for engaging with said switching means.

3. The pinch roller switching mechanism of an autoreverse car audio device for safely fixing a selected pinch roller as claim in claim 2, wherein said contacting portion is a roller.

4. The pinch roller switching mechanism of an autoreverse car audio device for safely fixing a selected pinch roller as claimed in claim 2, wherein said switching means comprises:

a sliding portion for converting the horizontal movement of said operation mode changing means to a pivoting movement, wherein said contacting portion slides along with said sliding portion according to the operation mode; and a switching portion integrally formed on an opposite side of said sliding portion and engaged with said pinch roller selecting means for moving said pinch roller selecting means toward the selected pinch roller according to the turning movement of said switching means.

5. The pinch roller switching mechanism of an autoreverse car audio device for safely fixing a selected pinch roller as claimed in claim 4, wherein said sliding portion comprises:

a head releasing portion formed in a straight line having a predetermined length and engaged with said contacting portion for moving said head from an ejecting position to an operating position and vice versa;

a transitional portion integrally enlarged from one end of said head releasing portion, said transitional portion providing a route, in which said contacting portion slides along with, for moving said pinch roller selecting means from the play portion to the ejecting position and vice versa to switch said pinch rollers; and a pivoting portion protruded from one end of said transitional portion and urged by said contacting portion for pivoting said switching means.

6. The pinch roller switching mechanism of an autoreverse car audio device for safely fixing a selected pinch roller as claim in claim 4, wherein said switching portion comprises a bifurcated end portion for engaging with said one side of said pinch roller selecting means to selectively approach one of said pinch rollers to the corresponding turntable wheel by sliding said pinch roller selecting means according to the turning movement of said switching means.

7. The pinch roller switching mechanism of an autoreverse car audio device for safely fixing a selected pinch roller as claimed in claim 6, wherein said head transporting means comprises an upper face having a guidance hole defined between said pinch rollers and for limiting the movement of the pinch roller selecting means.

8. The pinch roller switching mechanism of an autoreverse car audio device for safely fixing a selected pinch roller as claimed in claim 7, wherein said movement limiting means is a guiding plate having a roller installed at the rear face of the guiding plate, piercing through the guidance hole, and for contacting said pinch roller selecting means with said deck frame.

9. The pinch roller switching mechanism of an autoreverse car audio device for safely fixing a selected pinch roller as claimed in claim 8, wherein said base portion comprises:

an engaging portion protruded toward said deck frame and for engaging with said bifurcated end of said switching means; and protrusions protruded toward said deck frame being spaced equally from the head and for movably installing the base plate to the deck frame.

10. The pinch roller switching mechanism of an autoreverse car audio device for safely fixing a selected pinch roller as claimed in claim 9, wherein said pinch roller selecting means comprising:

a roller guidance hole for receiving the roller installed at the rear face of the guiding plate; and a limiting hole formed at the center of the pinch roller selecting means and for receiving the fastening protrusion of the head transporting means.

11. The pinch roller switching mechanism of an autoreverse car audio device for safely fixing a selected pinch roller as claimed in claim 10, wherein said selecting portion comprises blocking blades actuated relative with said pinch rollers.

12. The pinch roller switching mechanism of an autoreverse car audio device for safely fixing a selected pinch roller as claimed in claim 11, wherein front ends of said blocking blades are curvilinear for guiding said pinch rollers.

13. A pinch roller switching mechanism of an autoreverse car audio device for safely fixing a selected pinch roller comprising:

a deck frame installed at a deck chassis of a car audio device and having a base installed with pinch rollers thereon;

a means for changing an operation mode of the car audio device, said operation mode changing means movably installed at a rear face of said deck frame and moving parallel to the rear face of said deck frame according to the operation mode and having a contacting portion installed at one side of said operation mode changing means;

a means for switching said pinch rollers according to the movement of said operation mode changing means, said switching means pivotally installed at the rear face of said deck frame and contacted with said contacting portion of said operation mode changing means;

a means for transporting a head toward a tape direction and the opposite direction, said head transporting means movably installed at said deck frame;

a means for selecting one of said pinch rollers and for moving a selected pinch roller toward a corresponding turntable wheel, said pinch roller selecting means movably installed at a position between said deck frame and said head transporting means, and having a base portion contacted with said switching means to actuate relative with said operation mode changing means; and a means for limiting the movement of said pinch roller selecting means, said movement limiting means movably installed at said head transporting means;

wherein said switching means comprises:

a sliding portion for converting the horizontal movement of said operation mode changing means to a pivoting movement, said contacting portion sliding along with said sliding portion according to the operation mode; and a switching portion integrally formed on an opposite side of said sliding portion and engaged with said pinch roller selecting means for moving said pinch roller selecting means toward the selected pinch roller according to the turning movement of said switching means;

wherein said sliding portion comprises:

a head releasing portion formed in a straight line having a predetermined length and engaged with said contacting portion for moving said head from an ejecting position to an operating position and vice versa;

a transitional portion integrally enlarged from one end of said head releasing portion, said transitional portion providing a route, in which said contacting portion slides along with, for moving said pinch roller selecting means from the play position to the ejecting position and vice versa to switch said pinch rollers; and a pivoting portion protruded from one end of said transitional portion and urged by said contacting portion for pivoting said switching means.

* * * * *